3,561,974
METHOD OF MAKING HIGH PROTEIN BREAD
Francis Frederick Hansen, 224 E. Poplar St.,
Walla Walla, Wash. 99362
No Drawing. Continuation-in-part of application Ser. No.
447,047, Apr. 9, 1965. This application Sept. 2, 1969,
Ser. No. 854,765
Int. Cl. A21d 8/00, 13/06
U.S. Cl. 99—90                                       4 Claims

ABSTRACT OF THE DISCLOSURE

There is disclosed a protein bread which is high in all essential proteins of both milk and flour having a texture similar to white bread and a method of making the same wherein flour having a high protein content is used in conjunction with a milk protein concentrate readily dispersible in water and substantially free of fat and extremely low in lactose, with the weight of flour being greater than the weight of the milk concentrate, but with the milk protein exceeding in percentage the protein in the flour. Sodium bicarbonate and an edible acid such as sodium acid pyrophosphate are introduced into the dough as it is being mixed. The bicarbonate of soda raises the pH of the dough out of the acid range into the alkaline range to produce a more workable dough with substantially less water, whereas the sodium acid pyrophosphate reacts principally at temperatures of 100° F. and above and restores the desirable normal acidity corresponding to that of conventional white bread.

---

This invention is for an improvement in bread and a method of preparing the same, and more particularly it relates to bread having an especially high protein content, and is a continuation-in-part of Ser. No. 447,047 filed Apr. 9, 1965 and now abandoned.

The per capita consumption of bread made with wheat flour in this country has declined very substantially in the last quarter century century or so because of an increasing aversion to foods having a high starch and low protein content, and millions of people have eliminated it entirely, or almost entirely, from their every-day diet. It is estimated that the people of the United States consumed more wheat in the form of bread when the population was seventy-five million than at the present time with a population now of well over one hundred and eighty million. The increasing recognition of the importance of essential proteins in addition to the desire to avoid excessive starch has been another factor in the declining popularity of bread. Traditionally, however, bread is desired, and is a convenient food for ready use.

This invention is for an improved bread having a high essential protein content, but which has good flavor, good appearance and can be economically made in commercial bakeries.

Normal white bread as found on the shelves of stores today contains about 8.5% to 9% protein, most of it derived from wheat flour, but some of which is provided by milk and other additives, and whole wheat bread does not run more than 10% protein. Special dietary breads, such as gluten bread, may run much higher, even up to 40% protein, but in all cases this is predominantly the protein of flour which is deficient in some of the eight to ten amino acids which are essential amino compounds, and which the human body can neither make for itself nor store in the system. These must be provided day after day to provide a satisfactory complete diet. Hence the wheat flour protein, unless fortified with these other amino compounds, is not what is termed essential protein, and is not effectively used by the body unless the diet is supplemented by foods high in essential amino acids, and which are ingested about the same time.

Various laboratories have endeavored unsuccessfully to make a bread containing a high essential protein content. It is recognized that milk protein may be used to increase the essential amino acids of flour protein, but authorities consider that it is impossible to make bread where the dry whole milk or dry skim milk is as high as 15% of the weight of the flour.

With the present invention I provide a bread made with the weight of a milk protein concentrate being more than 50% the weight of the flour, actually of the order of 66⅔% the weight of the flour. The total protein content of the bread is 20 to 25% the total weight of the baked product with the protein of the wheat flour adequately fortified with amino acids essential to provide complete or essential protein. This level of essential protein in the bread is higher than the protein in meat and fish. Ounce for ounce, the bread of a sandwich made from this bread contains more essential protein than the meat or cheese which it encloses.

A major difficulty with the use of dried whole milk, dried skim milk or casein to produce bread having a high milk protein content arises from the fact that these products increase the acidity of the dough and require a greater quantity of water to make a workable dough having the proper plasticity. In the baking of the bread the water must be removed by evaporation in the hot oven, and the removal of the large amount of water so required lengthens the baking time so that a thick hard crust develops before the water is removed from the interior of the loaf, and as baking is prolonged the interior is drawn toward the crust without developing a normal texture or "crumb" characteristic of yeast-raised bread. Also the extended baking time along with the milk sugar content blackens the crust due to over-caramelization of the sugar.

According to the present invention, I overcome this difficulty by a combination of two procedures. The first is to use a commercially available milk protein concentrate obtainable on the market at the present time which contains the essential amino compounds necessary to supplement the protein in the flour and which is low in milk sugar or lactose. It requires less water than whole milk solids, skim milk or casein to form a dough. Also I incorporate in the dough sodium bicarbonate sufficient to raise the pH to an alkaline level. This enables the dough to be made and worked with less water than is required in conventional or special doughs which are inherently desirably acid in character. To offset the taste disadvantage of the alkalinity in the finished loaf, sodium pyrophosphate is also included in the dough. It remains inert, however, until the dough is in the oven when, at elevated temperature, it reacts with the sodium bicarbonate to neutralize it and bring the dough to an acid pH, the reaction producing a harmless sodium phosphate, so that the taste of the bread, as well as its appearance and texture, more nearly resembles the conventional loaf.

The object of my invention is to provide a new bread and method of making the same containing 20% or more of essential protein and having, except for a darker crust, appearance and texture traditionally expected in bread, and of a unique and pleasant flavor.

The usual ingredients for making of bread are, of course, normal wheat flour, yeast, sugar (beet or cane or corn), shortening, such as lard or lardlike hydrogenated oil or other fat substances or mixtures, along with water, milk, salt, and optionally yeast foods. In a usual procedure a "sponge" comprising part of the total flour, usually about 60%, with all of the yeast is "set," and after a period of time it is mixed with the remainder of the flour and other ingredients to form the final dough. This finished dough is cut into pieces, and then formed into loaves which are placed in pans and baked. The normal wheat flour used has a flour protein content of from 10% to about 12%. The milk may be boiled fresh whole milk, dried skim milk, but the amount of protein introduced from the milk is quite a small percentage of the protein in the entire finished loaf.

There are commercially available flours in which the protein is artificially raised to a higher level, either by dissolving out some of the starch, or dissolving out from a normal flour the gluten, drying it and supplying it to other flour. One commercially available flour is thus enriched to about 40-42% protein. Another is available through selective milling having a protein content between 22% and 24%, and ordinary gluten bread utilizes such flour. However, in the solvent extraction process some other values are lost which are not replenished in the bread formula, and although bread made therefrom is termed high protein bread, it is actually low or entirely lacking in some essential proteins.

According to the present invention a more or less normal sponge is set. The sponge is prepared by combining ingredients as follows in the approximate proportions specified:

|  | Pounds |
|---|---|
| Wheat flour running 22–24% protein | 20 |
| Wheat flour running 12–13% protein | 20 |
| Water | 50 |
| Yeast | 3 |
| Sugar (derived from cane, beet or corn) | 0.4 |
| Lard or other shortening (hydrogenated vegetable oils for example or mixtures) | 3 |
| Total | 96.4 |

These ingredients are mixed together and "set" for about four hours at 80° F.

In addition to the sponge, three other mixes, which are here identified as A, B and C, respectively, are prepared. In the following formula for these mixes, I have given the weights required for the foregoing weight of the sponge.

There is available commercially a milk protein concentrate for use by bakers that is high in milk protein, practically devoid of the fat contained in whole milk, and which is low in milk sugar (lactose), whereas dried whole milk and dried skim milk contain about 38% to 45% lactose. Unlike casein, it is fine powder readily dispersible in water. I am informed that it is derived from whey produced in the manufacture of cheese, or milk albumin to which its composition is comparable in many respects, and a principal commercial source is sold under the designation "Sheftene B.P.S." from Sheffield Chemical of Norwich, N.Y., a division of National Dairy Products Corporation, and is about 84% protein. A typical analysis as published by the manufacturer is:

|  | Percent |
|---|---|
| Nitrogen (as is basis) | 13.0 |
| Protein (N×6.38—as is basis) | 82.0 |
| Ash | 4.0 |
| Moisture | 5.5 |
| Ether extractables (lipids) | 4.5 |
| Carbohydrates (lactose) | 3.0 |
| Sodium | 1.0 |

Heavy metals (as Pb)—less than 10 parts/million.

Approximate amino acid content (calculated on as is basis):

|  | Percent |
|---|---|
| Arginine | 3.3 |
| Cystine and methionine | 4.4 |
| Histidine | 2.2 |
| Isoleucine | 6.1 |
| Leucine | 9.0 |
| Lysine | 7.8 |
| Phenylalanine | 4.5 |
| Threonine | 4.3 |
| Tryptophane | 1.6 |
| Valine | 5.8 |

It will be noted that amino compounds tryptophane, arginine and cystine are found in milk albumin and not in casein. (Van Nostrand's Scientific Encyclopedia, 3rd edition, p. 81.)

For the amount of sponge as above specified, mix A comprises about 30 lbs. concentrated milk protein as above described, Sheftene B.P.S.

To this is added sodium bicarbonate and preferably at this stage sodium acid pyrophosphate or sodium aluminum pyrophosphate which will neutralize the bicarbonate of soda only after the baking of the dough begins. These ingredients are combined in single acting baking powder which is more convenient to use than separately measuring and adding the two ingredients. Formula A therefore indicates 2½ lb. single acting baking commercial powder comprising sodium bicarbonate and sodium acid pyrophosphate. The total weight of mix A is therefore 32½ lbs. These ingredients of mix A should be intimately mixed to distribute the baking powder uniformly through the milk protein powder.

Mix B comprises:

|  | Pounds |
|---|---|
| Water | 50 |
| Yeast (variable) | 3 |
| Sugar (beet or cane sugar are preferable and the amount may be varied to taste) | 6 |
| Baking molasses (dark) optional for flavoring | 4 |
| Salt (NaCl) | 1 |
| "Arkady" yeast food or equal | 1½ [1] |
| Total | 64½ |

[1] This is desirable but not essential. "Arkady" is a standard preparation widely known in the baking industry comprised of salt (NaCl), ammonium chloride, calcium sulphate, starch and potassium bromate.

These ingredients should be mixed immediately before the final dough is prepared, and little time should elapse between the mixing and the subsequent use of the mix.

Mix C comprises:

|  | Pounds |
|---|---|
| Flour running 22 to 24% protein | 20 |
| Concentrated milk protein as described | 10 |
| Total | 30 |

This can be prepared at any time.

PROCEDURE

After the sponge has been prepared and set as described above, it is charged into a regular bread mixer. Mixes A and B are combined in a second vertical cake mixer which is run at slow speed for 2 or 3 minutes. The combination of A and B is then added to the sponge in the first mixer and mixed at slow speed for about 5 minutes or until the two are thoroughly incorporated and no lumps remain. Then mix C is slowly added as mixing continues, and when this is added the entire batch is mixed at medium speed for about ten minutes. Care must be taken to avoid over-mixing and this condition can be determined by an experienced baker. During this time the dough should be kept at a temperature between 70 and 80° F. After mixing, the dough should be discharged into the "trough" and without any "floor-time" immediately divided in the dough divider into separate pieces of the desired loaf weight. The pieces are then immediately charged into a proofer, and after proofing, molded and placed into pans. In sheeting the dough for molding, care should be taken that it is not sheeted as thin as dough made for ordinary white bread, because it tears easily. A baker will have no difficulty determining a thickness at which the sheeted dough will not be too thin. The proofing temperature should be in the general area of, but not over 100° F. and the dough will "proof" very rapidly since the yeast content is purposely very high, two or three times as much as would ordinarily be used with this amount of flour in normal baking where the yeast is about 2 or 3% of the total weight of the flour. Rapid proofing is desirable because the final dough with the high protein content deteriorates rapidly and full proofing is necessary because the dough in baking evidences little or practically no "oven spring," which means that it has little inherent ability to expand in the initial stages of baking, as do normal bread doughs.

Baking should be effected in a temperature of about 400° F. for thirty or more minutes, since this bread does not ""bake out" as fast as ordinary white bread and could be doughy inside unless the higher temperature and longer time for baking were provided. This, plus the high protein, results in a crust of very dark brown color and somewhat thicker than the crust of normal white bread, but nevertheless the crust is not hard and the interior of the loaf has the usual texture and crumb comparable to conventional white bread, although slightly more "off-white."

In the example here given, the total weight of flour is 60 pounds to 40 pounds of milk protein concentrate, but the milk concentrate has about 84% protein as against a maximum of 22% in the flour, so that the milk protein is predominant.

CALCULATION OF PROTEIN CONTENT

In the sponge, 20 lbs. of 22% protein flour provides 4.4 lbs. of protein. Twenty pounds of flour running 12% protein provides about 2.4 lbs. of protein. There is some protein in yeast, but this need not be considered. In mix A there are 30 lbs. of milk protein concentrate having not less than 84% protein, so $30 \times .84 = 25.2$ lbs. of protein. In mix B there is no appreciable amount of protein. In mix C the protein in flour is about 4.4 lbs. plus 8.4 in the milk protein concentrate. Summing up, there are 6.6 lbs. of protein in the sponge plus 25.2 in mix A, plus 12.8 in mix C, or a total of about 45 lbs. of protein.

The sponge loses about 5% of its total weight during fermentation, so that the final weight of the sponge in the mix is about 91.6 lbs. The total ingredients on the dough side weigh about 127 lbs. Added together, these weights give a complete weight of the dough of 218.6 lbs. During proofing, machining and baking, the dough loses about 10% of its total weight, or about 22 lbs. Deducting this loss of weight from 218.6 lbs., the finished weight of the bread is 196.6 lbs. Dividing the total weight of protein, 45 by 196.6 gives 23½%. This 23½% is in turn made up of better than 50% protein derived from milk and is 17% of the total weight of the bread. It is more than the amount needed to fortify or nutritionally complement the flour protein. Meat, fish, fowl and cheese range between 18 and 20% protein, so that this bread with 23½% now exceeds the protein content of these foods.

As heretofore indicated, and so far as I am aware, there has heretofore never been a bread having this high content of essential protein, and certain factors in the mixing are important. A certain amount of flour is necessary to give the bread its volume and texture. In the sponge therefore I use two commercially available flours, one with the higher protein than the other. I know of no flour commercially available that would provide the average secured by mixing the two, which in the present example is around 19% to 20%, but not as high as if all of the flour had 22 to 24%. I use no yeast food in the sponge because the bromate or oxidizer in yeast foods in the presence of high protein will toughen the gluten too much in the sponge stage. The water content in the sponge is much higher than is customary because of the high gluten content, but considerably less than would be required if dried whole milk or dried skim milk or casein were used as a source of protein, and if the dough had not been made alkaline by the use of sodium bicarbonate. The yeast is in much higher percentage to develop active fermentation in the sponge and vigorous activity in proofing and fermenting the final dough.

The preparation of mix A of the dough procedure involves mixing the dry concentrated milk protein with the recommended amount of single action baking powder. Mix A is in subsequent procedure mixed with B which contains all of the water and water-soluble ingredients. The baking powder which is a fine powder mixed through the milk protein concentrate, enables A and B to be mixed in a short time without lumping of the concentrate. Stage B, as stated, is where the water and soluble ingredients of the dough stage are combined and mixed to assure that these ingredients are completely dissolved and other ingredients uniformly dispersed. It should be prepared just before use to avoid fermentation at a stage where it would serve no purpose. Some of the sodium bicarbonate of the baking powder will react with the acid ions of the protein when the ingredients are combined, and reduce overall absorption of water, which is greater under more acid conditions. As explained above, one of the most difficult problems is controlling water absorption which at best is high and difficult to take out without leaving the interior of the loaf doughy. On the other hand, the bread must have sufficient moisture to have good eating qualities and not appear dry or stale or mostly a hard crust.

Stage C of the dough procedure is made separate from mix A largely for mechanical reasons. When A and B are mixed together they provide a reasonably wet mix that may then be combined with the sponge and thoroughly blended. The flour in Stage C aids to keep the remainder of the milk protein concentrate from lumping in the final step of mixing into the dough, and it also provides the final measure of flour needed to complete the dough. For convenience I have referred to A, B and C as separate mixes. It is not necessary that these mixes be prepared as separately compounded mixtures, but the ingredients may instead be weighed out and introduced singly or in combinations with the sponge when the sponge is returned to the mixer to complete the dough.

The milk protein concentrate normally tends to form a glutinous, rubbery cohesive mass when mixed with water and requires more water than could be baked out to give it a plasticity required for mixing into a dough. I have found that this concentrate, like other milk protein concentrates, is slightly acid, but is more readily dispersible in water, so that less water is required. By using a single acting baking powder, enough of the sodium bicarbonate will react with the protein at mixing temperature to render the concentrate slightly alkaline, whereupon it may be much more easily mixed with the other ingredients without requiring excessive water. When the dough is baked, the sodium pyrophosphate will react with the remaining sodium bicarbonate to yield gas which will impart some oven spring and volume to the loaf, but this is incidental, its important function being to bring the dough back to the acid side of neutral, somewhere about pH 5.5. This is comparable to the pH of white bread and it is a condition important to imparting the desired flavor to the bread. If sodium bicarbonate alone were used, this desirable flavor would be lost and its flavor would be particularly unattractive to a person who is especially critical of the flavor. It is also important that the baking powder be a single acting powder, as contrasted with the familiar double acting ones, since in the double acting powder one acid salt reacts with the sodium bicarbonate at room temperature and another at the baking temperature, and this would be detrimental to my process of converting the protein concentrate slightly to an alkaline pH and then, as oven heat penetrates the dough, bringing the dough back to a mildly acid side. Other heat acting acid salts may be used in place of sodium pyrophosphate, but I prefer this one because of the better flavor it gives to the bread. Desirably there are 5–6 parts by weight NaHCO$_3$ to 4–5 parts Na$_2$H$_2$P$_2$O$_7$, and 100 lbs. of the baking powder may contain about 3% cornstarch and .5% calcium silicate finely powdered to keep the powder free-flowing. The active baking powder ingredients, as above explained, could be separately introduced so long as the NaHCO$_3$ was first available to contact the protein concentrate.

The final dough does not lend itself to twisting as does normal white bread and therefore is best molded and panned as one piece or is cross-panned where the one piece is cut into three or four pieces and each piece panned crosswise of the pan. The dough is somewhat more sticky than conventional bread douh, so that more dusting flour may be required in the dividing and forming operation, this stickiness resulting both from the more abundant use of water in the makeup of the dough, and because of the high protein content. Corn starch is preferably used for surface dusting to overcome this stickiness since a lesser amount is required to combat the stickiness, but regular wheat flour will serve this purpose, larger quantities, however, being required.

The amounts of sugar and salt and molasses are not critical, but since the taste of the bread, due to the presence of the high milk protein content is different from the taste of conventional white bread, the more free use of salt and sugar and mollasses masks this taste and for most people provides a unique and pleasing flavor. Water absorption can be raised or lowered to suit different flours and conditions, but generally the dough should be kept on the stiff or firm side for best results.

To one not familiar with the baking of bread, it may appear simple to add or subtract ingredients at will, but to a cereal chemist it is believed that this bread and its method of preparation presents an achievement of a surprising and heretofore unobtainable character. The bread is a much more complete food than normal bread; needs not be accompanied by the drinking of quantities of milk to complement its flour protein, and for those who reject bread because of its high starch and low protein, it provides a convenient high protein food and even the added use of sugar does not offset the overall carbohydrate reduction which is here obtained. In the example here given, the entire protein is of the order of 23½% of the weight of the backed bread, but there will be some variation, but it should not be lower than 20% to secure the beneficial properties of the bread, and it may be somewhat higher than 23½%. Not only is the bread a useful food for day-to-day home use, and to persons whose meal must consist principally of sandwiches, but it provides a useful food for feeding in disaster areas, military operations, and other mass feeding situations where a high protein food is desirable and transportation facilities for a variety of foods may be limited.

Some deviation from the formulae here outlined may be necessary where different conditions prevail, such as the mineral content of the water, character and age of the flour, and the humidity in the bakery. Also market requirements may result in flours of different gluten or protein content becoming available. The dry ingredients such as those used for the sponge and for mixes A and C may be mixed in advance and distributed to bakers who supply the remaining ingredients according to direction. Important factors are the use of larger than normal amounts of yeast and the introduction of the milk protein concentrate to the dough only in the final stages of preparing the dough mix so as to minimize the time before proofing that the concentrate, water and yeast are together in the dough, and the use of the baking powder or its equivalent ingredients as hereinbefore explained is important to working the dough and securing the easier and more uniform diffusion of the milk protein concentrate through the dough. I have found that about 2½% of baking powder has proved desirable in mixes I have prepared, but some bakers may fined that better results are secured by varying this, perhaps due to the water or other variables, and it may range between 1% and 3% to each 100 lbs. of flour. The protein content may be reduced somewhat below the content herein specified, or slightly above to meet the baker's desire or the public taste, but should range between 15% and 25% and preferably be around 20% to 23.5%, but in any case the milk protein should predominate. Also, where the quality of the wheat flour makes it desirable, and since most wheat flour is low or entirely lacking in one essential amino acid, lysine monohydrochloride (sometimes called lysine hydrochloride), I may add to the sponge stage about 0.1% (one-tenth of one percent) based on total flour in the formula commercially available lysine. This amounts to about 1 oz. for the total of sixty pounds of flour in the formula above described, and thereby increases the body utilization of the protein in the bread. The other vitamin-enriching substances employed in the industry may also be used.

I claim:

1. The method of making a high protein yeast-raised bread of a texture comparable to white bread which comprises:
   (a) setting a sponge comprised of selectively milled wheat flour in which the average of flour protein is above 17% and less than 25%, water, sugar, shortening and yeast,
   (b) thereafter adding to the sponge two separately-prepared mixes, one of which comprises a water-dispersible milk protein concentrate as derived from milk albumin and whey of milk produced in the manufacture of cheese having a milk protein content of about 84% and not substantially more than 3% of lactose through which is diffused a single-acting baking powder comprised of sodium bicarbonate and an acid salt that reacts with sodium bicarbonate only as baking temperature is approached in an amount sufficient to render the resulting dough in which the mix is incorporated slightly alkaline, the second mix comprising water, yeast, sugar, salt and flavoring,
   (c) combining with the sponge and said first two mixes selectively milled flour having a protein content of 22 to 24% and additional amounts of said milk protein concentrate in such proportions that the loaf, when baked, has between 20% and 25% of combined proteins with more than 50% of the protein being milk protein,
   (d) forming the dough so produced into loaves and baking the same with the acid salt of single-acting baking powder than reacting with the sodium bicarbonate to lower the pH to the acid side of neutral.

2. The method of making yeast-raised bread having a texture comparable to white bread as defined in claim 1 in which the sponge is set for about five hours in advance of the preparation of the dough at a temperature of between 70° F. and 80° F. and wherein the sponge comprises the approximate proportions:

20 lbs. of wheat flour having 22–24% protein
20 lbs. of wheat flour having 12–13% protein
50 lbs. of water
3 lbs. of yeast
3 lbs. of shortening
0.4 lb. of sugar and the first of said two mixes comprises in the approximate proportions for the sponge:

30 lbs. of said milk protein concentrate of about 84% protein
2½ lbs. of single acting baking powder and the second mix comprises in the approximate proportions:

50 lbs. of water
3 lbs. of yeast
6 lbs. of sugar
0 to 4 lbs. dark baking molasses
1 lb. of salt
½ lb. of yeast food and the last mix added to the dough for the above proportions comprises approximately:

20 lbs. of flour of a protein content of 22–24%
10 lbs. of said milk protein concentrate.

3. The method of making a high protein yeast-raised bread of a texture comparable to white bread and with a milk protein content higher than the wheat protein content which comprises:
   (a) setting a sponge comprised of selectively milled wheat flour having an average protein content which is above 17% and less than 25%, water, sugar, shortening and yeast,
   (b) after the sponge has set combining therewith a water-dispersible milk protein concentrate having a milk protein content of about 84% and having not substantially more than 3% of lactose and an amino acid composition comparable to milk albumin, single-acting baking powder comprised of sodium bicarbonate and an acid salt that principally reacts with sodium bicarbonate only as baking temperature is approached in an amount sufficient to render the resulting dough slightly alkaline, and also adding additional water, yeast, sugar and salt along with additional selectively milled flour having a protein content of 22 to 24% to form a complete dough, the amount of said milk protein concentrate being in such proportion that the baked loaf has 15% to 25% of combined protein with more than 50% of the protein being milk protein,
   (c) forming the dough so produced into loaves and baking the same with the said acid salt then reacting with sodium bicarbonate to lower the pH to the acid side of neutral.

4. In the process of making a high protein bread, the steps comprising:
   (a) preparing a sponge comprising principally selectively milled wheat flour having an average protein content of about 19 to 20%, yeast and water,
   (b) after the sponge has set, combining with the sponge a prepared mixture comprising milk protein concentrate which is readily dispersible in water and which has an average protein content of about 84% and not more than 3% of lactose, the protein having substantially the following amino acid content:

| | Percent |
|---|---|
| Arginine | 3.3 |
| Cystine and methionine | 4.4 |
| Histidine | 2.2 |
| Isoleucine | 6.1 |
| Leucine | 9.0 |
| Lysine | 7.8 |
| Phenylalanine | 4.5 |
| Threonine | 4.3 |
| Tryptophane | 1.6 |
| Valine | 5.8 |

(c) introducing sodium bicarbonate into said mixture of sponge, milk protein concentrate and water sufficient to increase the pH above the alkaline side of neutral,
   (d) adding additional selectively milled high protein flour and more of said milk concentrate to make a dough,
   (e) adding into the dough at some stage during its preparation sodium pyrophosphate in an amount sufficient to neutralize the bicarbonate of soda when the dough is baked and reduce the pH to an acid level in the range between 5 and 6,
   (f) forming the dough into loaves and proofing the same, the ingredients in the dough being in the following approximate proportions: 60 pounds of flour to 40 pounds of the milk protein concentrate; 100 pounds of water to 100 pounds of combined flour and milk concentrate; sodium bicarbonate and sodium pyrophosphate being in the ratio of 5 to 6 parts by weight of sodium bicarbonate to 4 to 5 parts by weight of sodium pyrophosphate with the mixture of the two being in the range of between 1 pound and 3 pounds, the total yeast being variable but of the order of 6 pounds, 3 pounds of which are introduced into the sponge and the remainder of which is introduced with the first milk protein concentrate, and with sugar, shortening, flavoring, salt and yeast food in optional amounts.

References Cited
UNITED STATES PATENTS

| 2,989,399 | 6/1961 | Ehle | 99—90 |
| 3,076,710 | 2/1963 | Koolhaas | 99—90 |
| 3,214,275 | 10/1965 | Kende et al. | 99—90X |
| 3,269,843 | 8/1966 | McKee et al. | 99—94 |

OTHER REFERENCES

Technical Data (Sheftene B.P.S.) Sheffield Chemical, Norwich, N.Y., Aug. 8, 1961.

JOSEPH M. GOLIAN, Primary Examiner